Nov. 14, 1961 H. DAVISON 3,008,156
REVERSIBLE TOOL SPINDLE FEED MEANS
Filed Dec. 19, 1958 2 Sheets-Sheet 1
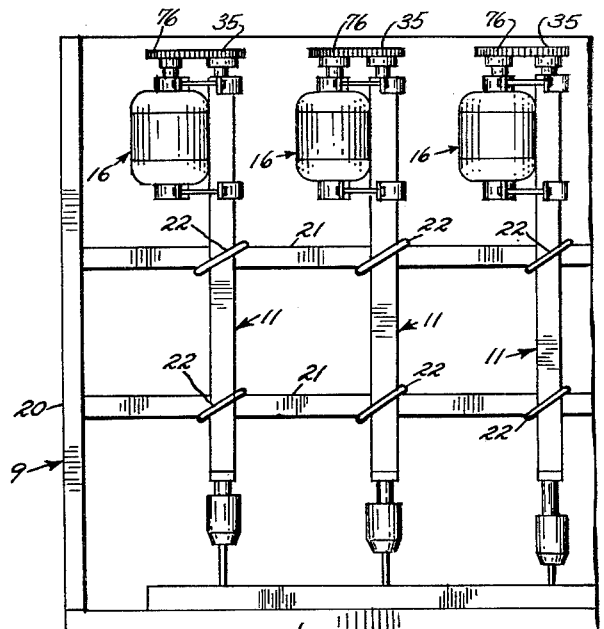
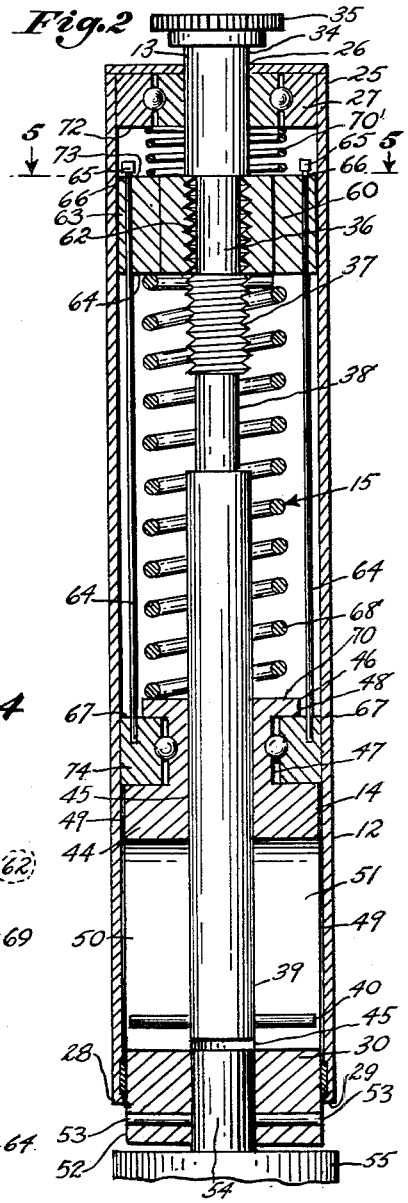
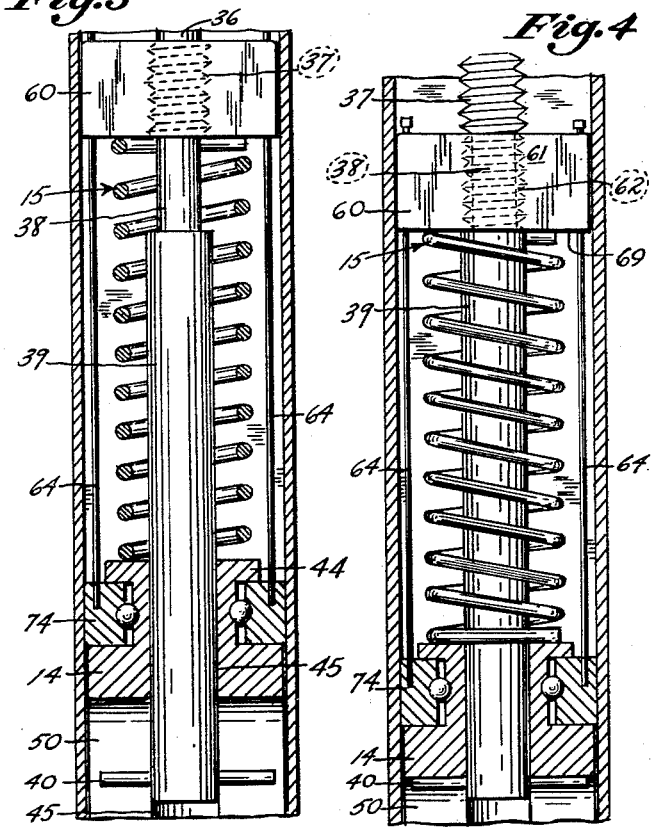

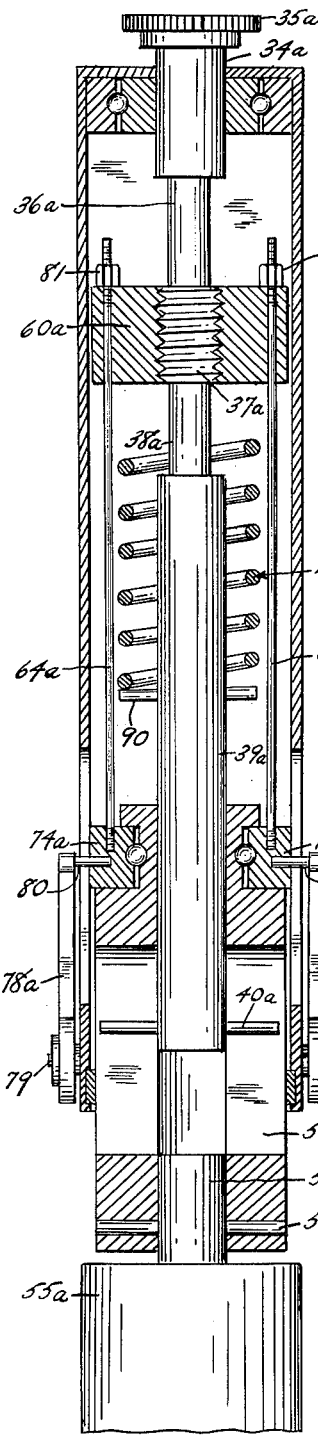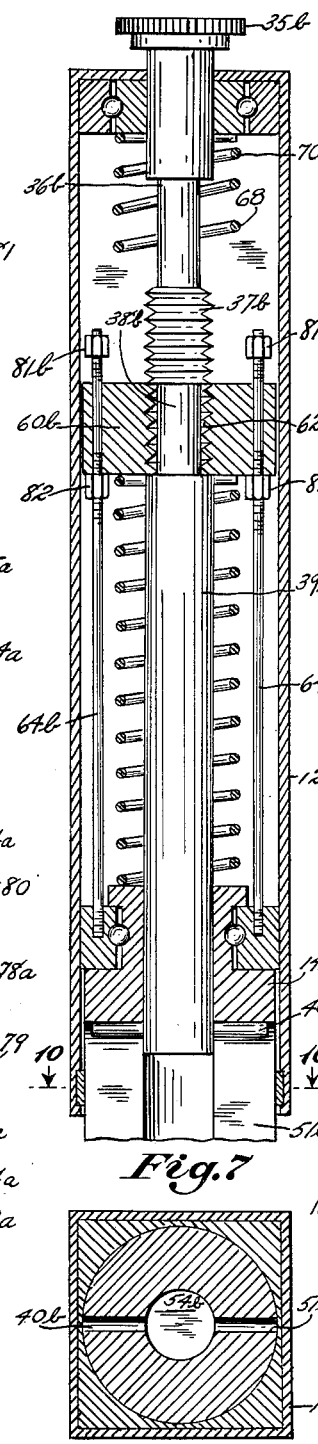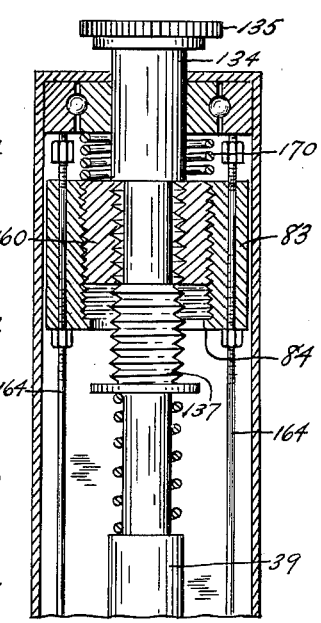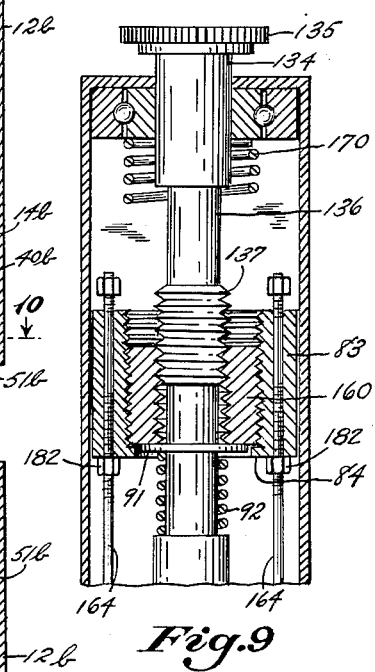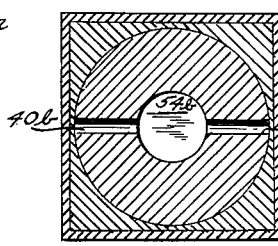

United States Patent Office 3,008,156
Patented Nov. 14, 1961

3,008,156
REVERSIBLE TOOL SPINDLE FEED MEANS
Herbert Davison, 41 Hilldale Road, Albertson, N.Y.
Filed Dec. 19, 1958, Ser. No. 781,582
5 Claims. (Cl. 10—139)

This invention relates generally to the field of machine tools, and more particularly to an improved powered unit specifically adapted for performing drilling and tapping operations in conjunction with other similar units performing simultaneous operations. The invention has particular application to short-run mass production techniques.

Where large numbers of identical machining operations are to be performed on each of a plurality of similar work pieces, it is common to design and build an entire machine tool solely for the purpose of performing these operations. The cost of such tools can be justified only where tooling costs are quickly amortised and the machine continues to serve a useful purpose. Many articles of manufacture are produced on a limited mass production basis, and the cost of such tooling can nowhere near be justified. On the other hand, where a substantial number of machining operations are to be performed, it is desirable that the same be accomplished simultaneously in order to keep down production cost and time of manufacture.

One of the most common machining operations is the drilling and tapping of screw holes in sheet material, and it is among the principal objects of the present invention to provide an improved drilling and tapping unit which may be installed upon a supporting frame element in predetermined spaced relation with respect to other similar units, so that upon the jigging of a series of work pieces, a plurality of holes may be drilled and tapped in a relatively short period of time.

Another object of the invention lies in the provision of an improved drilling device in which the cutting bit is applied to the work piece in a predetermined progressive or a resilient manner, thus permitting the device to feed into the work piece at a constant rate, or as fast as the cutting action will permit.

Another object of the invention lies in the provision of a device of the class described including means for automatically breaking into pieces a spiral cutting chip at regular intervals, thus eliminating the need of separate chip breaker means usually necessary where precision dimensions are required.

A further object of the invention lies in the provision of an improved drilling and tapping device of the class described incorporating means for limiting the amount of travel of the drill bit in an axial direction.

Still another object of the invention lies in the provision of a drilling and tapping device which includes means for returning a tool bit to a predetermined initial starting position.

A feature of the invention lies in the fact that the inventive structure may be produced at a reasonably low manufacturing cost, thereby permitting relatively wide distribution and use.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

FIGURE 1 is a view in elevation of an embodiment of the invention.

FIGURE 2 is a vertical sectional view showing one of the drilling and tapping devices comprising a part of the embodiment, as seen from the plane 2—2 on FIGURE 5.

FIGURE 3 is a similar sectional view showing the relative position of certain moving parts during the drilling operation.

FIGURE 4 is a similar sectional view showing the completion of a drilling operation, and just prior to a return of the moving parts to the position shown on FIGURE 2.

FIGURE 5 is a horizontal sectional view as seen from the plane 5—5 on FIGURE 2.

FIGURE 6 is a fragmentary vertical sectional view showing an alternate form of the device.

FIGURE 7 is a fragmentary vertical sectional view showing a second alternate form of the device.

FIGURES 8 and 9 are fragmentary vertical sectional views showing a second embodiment of the invention, in which certain of the parts are disposed in altered relative position.

FIGURE 10 is a horizontal sectional view as seen from the plane 10—10 on FIGURE 7.

In accordance with the first embodiment of the invention, the device, generally indicated by reference character 9, comprises broadly: a work table element 10, a plurality of elongated drilling units 11.

The work table element 10 may be of any suitable construction, and as best seen in FIGURE 1 on the drawing, includes a horizontal table member 18 having supporting legs 19, and a plurality of upright support members 20 adjustable in a horizontal plane upon the table member 18. The upright support members 20 in turn support a plurality of horizontal support members 21 upon which the drilling and tapping units 11 are mounted. Adjustable clamping means 22 permits relocation of the units 11 at any desired position.

The drilling and tapping units 11 are substantially similar, and accordingly, a detailed description of one of said units will serve equally well to describe all. Each unit 11 includes an elongated casing element 12, a lead screw element 13, a chuck supporting element 14, chuck supporting element advancing and retracting means 15, and a prime mover element 16.

The casing element 12 is of polygonal cross-section, and includes an upper end 25 having an opening 26 and a bearing 27 disposed in the opening 26. The lower end 28 includes a similar lower opening 29 having a corresponding bearing 30.

The lead screw element 13 is preferably of machined steel, and includes an upper end 34 having a driving gear 35 thereon, an upper undercut segment 36, a threaded segment 37 which may be a single or multiple thread. The thread may be of left or righthand type, the righthand type being used for drilling with a common drill bit wherein the spindle is required to rotate in a clockwise fashion. As is well known in the art, a righthand type of thread on the spindle would be used for tapping righthand threads. The lower end 39 is provided with a normally disposed pin 40 which provides a splined interconnection with the chuck supporting element 14.

The chuck supporting element 14 includes a cylindrical member 44 having an axially disposed hollow bore 45. The upper end 46 thereof includes a relatively deeply undercut segment 47 forming a flange 48. The middle segment 49 includes a pair of pin engaging channels 50 and 51 in which the pin 40 is slidably disposed. The lower end 52 of the bore 45 has chuck retaining screws 53 projecting thereinto, for the retention of the rear shaft portion 54 of a conventional chuck 55.

The advancement and retraction means 15 includes a polygonal threaded nut 60 of metal or of Teflon, nylon, or other synthetic material possessing similar properties. The nut 60 includes a polygonal outer surface 61 and a threaded bore 62 substantially centrally disposed. A plurality of smooth bores 63 provide for the sliding engagement of a similar number of guide rods 64 passing therethrough. Each of the guide rods 64 is provided with an adjustable collar 65 at the upper end 66 thereof, the lower end 67 being fixedly attached to the bearing 74. A coil spring 68 is coaxially disposed about the lead screw element 13, the upper end engaging the under surface 69 of the nut 60 and the lower end engaging the upper surface 70 of the flange 48. A smaller coil spring 70' is also coaxially disposed upon the lead screw element 13, the upper end of which contacts the under surface 72 of the upper bearing 27, and the lower end of which contacts the upper surface 73 of the nut 60. A bearing 74 is confined within the undercut segment 47 on the cylindrical member 44, and slides upwardly and downwardly therewith.

The operation of the unit 11 is as follows. Starting in the position shown in FIGURE 3, the nut 60 is disposed upon the upper undercut segment 36. Rotational power from a motor 16 is transmitted through a gear 76 to the gear 35. Rotation of the lead screw element 13 causes engagement of the threads on the nut 60 with those of the threaded segment 37, resulting in the driving of the nut in a downwardly direction for so long a period as any portion of the threads on the nut and the threaded segment remain in mutual engagement. With the downward travel of the nut 60, the spring 68 is compressed, resulting in the transmission of a force to the flange 48. Where the tool disposed in the chuck 55 meets no resistance, it travels downwardly at a uniform rate until contact with the work piece is made. At this point, the nut 60 continues downwardly so that the resilient force upon the chuck is increased. When the nut 60 has been driven below the threaded segment 37 and lies upon the lower undercut area 38, no further downward motion occurs, and the drilling operation continues. With the passage of the ends of the threads on the nut 60 and the threaded segment 37, a slight jiggling motion occurs with each revolution of the lead screw element 13, this motion being transmitted as a vibration to the tool which results in the fracture of the metal comprising the chip being cut from the work piece, and its subsequent breakage. This operation makes unnecessary the provision of additional chip breaking means, and materially increases the speed at which the hole may be drilled. With rotation of the lead screw element, motion is transmitted through the pin 40 to the channels 50 and 51 resulting in rotational motion of the chuck 55 irrespective of the axial position thereof with respect to the lead screw element.

At the completion of the drilling operation to the desired depth, the motor 16 is reversed with the immediate engagement of the threaded segment 37 with the threads in the nut 60. With continued rotation, the nut 60 travels upwardly to a point where the upper surface 73 contacts the enlargements 65 on the rod 64, and subsequent upward motion is transmitted to result in an upward movement of the chuck 55. This motion is completed with the disengagement of the threads as the nut 60 moves onto the upper undercut segment 36. Subsequent reengagement is positive owing to the pressure of the spring 70' upon the upper surface 73.

Turning now to the alternate form of the first embodiment as shown on FIGURE 6, parts corresponding to those of the principal form of the first embodiment have been designated by similar reference characters with the additional suffix "a."

The first alternate form of the embodiment differs from the principal form in the elimination of the spring 70, and the provision of negator springs 78a which wind about spindle 79, and transmit a relatively constant force to pins 80. This construction has the advantage of providing a relatively constant spring tension during feeding, owing to the nature of the action of a negator spring, resulting in uniform pressure upon the drill bit throughout the drilling operation.

The enlargements 65 of the principal form of the first embodiment are replaced by threaded bolts 81 which permit adjustability of the effective length of the rod 64a, thereby facilitating the setting up of the device for operation.

The spring 15a is supported by a pin 90 through the member 39a so that when the nut 60a travels downwardly into the undercut segment 38a, it compresses the spring 15a. When the shaft 34a is reversed, the spring will be supporting the nut member 60a against the threads 37a, and the nut member 60a will travel upwardly. When the nut member has reached the upper undercut 36a, it will ride on the thread due to tension of the springs 78a which is transmitted through the bearing 74a, guide rod 64a to nuts 81.

Turning now to the second alternate form of the embodiment, parts corresponding to these of the principal form have been designated by similar reference characters with the additional suffix "b."

The second alternate form of the first embodiment differs from the principal form in the provision of additional nuts 82 which limit in both directions the travel of the member 60 upon the rod 64. This form of the embodiment is useful where positive driving is desired in the absence of a resilient pressure on the drill bit. As may be observed on FIGURE 7, the action of the spring 68 is bypassed by the transmission of the advancement force directly through the rods 64b.

Turning now to the second embodiment of the invention, parts corresponding to those of the first embodiment have been designated by similar reference characters with the additional prefix "1."

The second embodiment of the invention differs from the first embodiment in the provision of an additional nut member 83 having internal threads and an arcuate flange 84, engaged with the nut member 160. The nut member 83 is provided with a flange 84 which limits the downward travel of the nut member 160 therewithin. The threaded interconnection between the nut member 160 and the nut member 83 is by means of a relatively coarse thread, whereas the threaded interconnection with the nut member 160 and the threads 137 is by a relatively fine thread. In operation, the engagement of the coarse threads permits a relatively rapid advance to the point of entry of the drill bit or tap into the work, at which time the threaded segment 137 has progressed from the relative position shown on FIGURE 8 to the relative position shown on FIGURE 9. With the locking of the nut member 160 within the nut member 84, subsequent rotation of the threaded segment 137 advances the drill bit at a slower rate owing to the employment of finer threads at this point in the operation.

During operation, the washer 91 and spring 92 are used as the means to lock the nut 160 within the nut 83, while the flange 84 is used to bring the nut 160 back to the starting position by reversal of shaft 134.

It may thus be seen that I have invented novel and highly useful improvements in drilling and tapping units, which at the commencement of a drilling cycle will resiliently feed the cutting bit to the work piece and maintain a constant resilient feeding pressure until the drilling operation is completed. At the completion of such operation, the device may be reversed to immediately withdraw the bit and prepare the unit for another succeeding cycle. By substituting a tapping tool, the device may also be employed for tapping operations without further modification.

By substituting the proper tool, the device may be employed for spinning rivets, countersinking operations, counterboring operations, reaming operations, as well as the driving and removing of screws and nuts (using a ratchet attachment). The device also has use in grinding, sanding, polishing and buffing operations.

Owing to the fact that the device in operation imparts a retracting action to the drill, causing the chip to break at each revolution, only small chips are formed, which readily travel up the drill flute, and coolant may flow down to the cutting edges of the drill. The retracting action permits only that size of chip to be removed that is practical without tearing, resulting in a smooth finished hole. Depths of as much as 10 diameters or more may be drilled without clearing the drill, and speeds up to 400% faster than normal are also possible.

I wish it to be understood that I do not consider the invention limited to the precise details of structure shown and set forth in this specification, for obvious modifications will occur to those skilled in the art to which the invention relates.

I claim:

1. A drilling and tapping device comprising: a lead screw, means supporting said lead screw for rotation about a principal axis, means for rotating said lead screw selectively in first and second opposite directions, an elongated cylindrical member having an axially disposed bore therein, said cylindrical member being slideably disposed upon a portion of said lead screw element in splined relation, said cylindrical member having a first free end thereof having tool supporting means thereon, said lead screw having a threaded segment thereon and first and second undercut segments at each end of said threaded segment, said undercut segments being of a length at least equal to that of said nut member, a nut member surrounding said lead screw, said nut member having threaded means engageable with said threaded segment, and being fixed against rotational movement, wherein rotation of said lead screw will cause movement of said nut element along the axis of said lead screw for such period as said nut element is disposed upon said threaded segment and means interconnecting said nut member and said cylindrical member.

2. A drilling and tapping device comprising: a lead screw, means supporting said lead screw for rotation about a principal axis, means for rotating said lead screw selectively in first and second opposite directions, an elongated cylindrical member having an axially disposed bore therein, said cylindrical member being slideably disposed upon a portion of said lead screw element in splined relation, said cylindrical member having a first free end thereof having tool supporting means thereon, said lead screw having a threaded segment thereon and first and second undercut segments at each end of said threaded segment, said undercut segments being of a length at least equal to that of said nut member, a nut member surrounding said lead screw, said nut member having threaded means engageable with said threaded segment, and being fixed against rotational movement, whereby rotation of said lead screw will cause movement of said nut element along the axis of said lead screw for such period as said nut element is disposed upon said threaded segment; and resilient means interconnecting said nut member and said cylindrical member, said resilient means having a line of action parallel to the axis of said lead screw and means interconnecting said nut member and said cylindrical member.

3. A drilling and tapping device comprising: a lead screw, means supporting said lead screw for rotation about a principal axis, means for rotating said lead screw selectively in first and second opposite directions, an elongated cylindrical member having an axially disposed bore therein, said cylindrical member being slideably disposed upon a portion of said lead screw element in splined relation, said cylindrical member having a first free end thereof having tool supporting means thereon, said lead screw having a threaded segment thereon and first and second undercut segments at each end of said threaded segment, said undercut segments being of a length at least equal to that of said nut member, a nut member surrounding said lead screw, said nut member having threaded means engageable with said threaded segment, and being fixed against rotational movement, whereby rotation of said lead screw will cause movement of said nut element along the axis of said lead screw for such period as said nut element is disposed upon said threaded segment, resilient means interconnecting said nut member and said cylindrical member, said resilient means having a line of action parallel to the axis of said lead screw; and at least one elongated guide rod having a first end fixedly associated with said cylindrical member and a second end slideably associated with said nut member, said second end having means limiting the relative movement thereof with respect to said nut member and means interconnecting said nut member and said cylindrical member.

4. A drilling and tapping device comprising: a lead screw, means supporting said lead screw for rotation about a principal axis, means for rotating said lead screw selectively in first and second opposite directions, an elongated cylindrical member having an axially disposed bore therein, said cylindrical member being slideably disposed upon a portion of said lead screw element in splined relation, said cylindrical member having a first free end thereof having tool supporting means thereon, said lead screw having a threaded segment thereon and first and second undercut segments at each end of said threaded segment, a nut member surrounding said lead screw, said undercut segments being of a length at least equal to that of said nut member, said nut member having threaded means engageable with said threaded segment, and being fixed against rotational movement, whereby rotation of said lead screw will cause movement of said nut element along the axis of said lead screw for such period as said nut element is disposed upon said threaded segment and means interconnecting said nut member and said cylindrical member.

5. A drilling and tapping device comprising: a lead screw, means supporting said lead screw for rotation about a principal axis, means for rotating said lead screw selectively in first and second opposite directions, an elongated cylindrical member having an axially disposed bore therein, said cylindrical member being slideably disposed upon a portion of said lead screw element in splined relation, said cylindrical member having a first free end thereof having tool supporting means thereon, said lead screw having a threaded segment thereon and first and second undercut segments at each end of said threaded segment, said undercut segments being of a length at least equal to that of said nut member, a first nut member surrounding said lead screw, said nut member having threaded means engageable wtih said threaded segment, a second nut element coaxially arranged with respect to said first nut member and having threaded means engageable with the outer surface of said first nut member, said second nut member being fixed against axial rotational movement, whereby rotation of said lead screw will initially cause rotation of said first nut element with respect to said second nut element, and subsequently cause movement of said first nut element along the axis of said lead screw for such period as said nut element is disposed upon said threaded segment; and at least one elongated guide rod having a first end fixedly associated with said cylindrical member and a second end adjustably associated with said nut member, said second end having means to limit the relative movement thereof with respect to said nut member.

References Cited in the file of this patent

UNITED STATES PATENTS

| | | |
|---|---|---|
| 1,592,009 | Sampson | July 13, 1926 |
| 1,861,350 | Mansfield | May 31, 1932 |
| 2,504,018 | Gibson | Apr. 11, 1950 |